United States Patent Office 3,808,328
Patented Apr. 30, 1974

3,808,328
MANUFACTURE OF CARBON BLACK FROM FEEDSTOCK OIL MODIFIED WITH RUBBER
William A. Kelly, Odessa, Tex., assignor to Columbian Carbon Company, New York, N.Y.
No Drawing. Filed Dec. 10, 1969, Ser. No. 884,037
Int. Cl. C09c 1/48, 1/50
U.S. Cl. 423—449   9 Claims

ABSTRACT OF THE DISCLOSURE

Rubber is incorporated with a liquid hydrocarbon to produce a carbon black feedstock oil. Scrap rubber, especially old automobile tires, is thus utilized for commercial production of carbon black. More particularly, scrap tires are digested in an aromatic carbon black feedstock oil, e.g. BMCI of about 90 to about 160, to dissolve the rubber and to suspend insoluble components of the tire compound within the oil. The resultant liquid feedstock is then thermally decomposed in accordance with conventional practices for producing commercially available grades of carbon black.

BACKGROUND OF THE INVENTION

This invention relates to the manufacture of carbon black and more particularly to a method for manufacturing carbon black from rubber, especially scrap or waste rubber.

Disposing of scrap rubber has become a major problem since the conventional method of disposal is to burn the rubber in open air, an indiscriminate practice which liberates huge quantities of waste carbon and other pollutants into the atmosphere. The problem is best appreciated by realization of the fact that something like 100,000,000 worn-out automobile tires must be disposed of each year, the predominate portion of which is now burned.

SUMMARY OF THE INVENTION

One object of the present invention is to make carbon black from rubber, especially scrap or waste rubber.

Another object of the present invention is the disposal of scrap or waste rubber in a manner which prevents pollution of the atomsphere as occurs in the open-air burning of rubber.

Still another object of the present invention is to provide a carbon black feedstock which comprises rubber.

In accordance with the present invention, rubber is incorporated with a liquid hydrocarbon to produce a carbon black feedstock which is in turn dispersed within highly heated gases. The dispersed feedstock is thermally decomposed by absorption of heat from the hot gases, thus forming carbon black which is subsequently separated from the gases and recovered in a conventional manner.

The invention may be carried out with a wide variety of rubbers and liquid hydrocarbons, but in practice the rubber should be soluble—or at least discretely dispersible—in a liquid hydrocarbon which is already preferable for use as a carbon black feedstock, e.g. an aromatic hydrocarbon. To advantage, the aromatic hydrocarbon can have a (Bureau of Mines Correlation Index) within the range of about 90 to about 160, and more particularly within the range of about 115 to about 135.

Desirably, the rubber should be highly soluble in the liquid hydrocarbon, but this is by no means essential, since hydrocarbons containing 10% or less, by weight, of rubber can be satisfactorily employed as a carbon black feedstock. Vulcanized rubbers in general are not highly soluble in liquid hydrocarbons since they are more inclined to "swell" rather than dissolve rapidly. Even if the rubber is vulcanized, dissolution is impeded by formation of a gelatinous layer, by absorption of the solvent, on the surface of the rubber particle. This surface layer, or membrane, opposes rapid and complete dissolution of the rubber since it acts as a barrier which the solvent must permeate in order to reach more soluble components of the particle. However, prolonged agitation of the mixture can effect disruption of the gelatinous membrane to achieve either (1) total dissolution or (2) partial dissolution accompanied by discrete dispersion and suspension of tiny particles of the rubber compound within the hydrocarbon.

In accordance with the present invention, the degree of dissolution and/or dispersion of a rubber, or rubber compound, need be sufficient to the extent that pumping, metering and spraying of the resultant carbon black feedstock can be accomplished with procedures which are already well known. If the rubber is already in solution form or is very finely subdivided, it can be mixed with the hydrocarbon for formation of a feedstock which can be used without any substantial digestion of the rubber beforehand. Using larger particles of rubber, or a rubber compound, digestion thereof by the hydrocarbon can be accomplished with agitation and heat to achieve total or partial dissolution of the rubber and other soluble compounding ingredients which may be contained therein, or dissolution in the hydrocarbon may be partial and accompanied by dispersion and suspension of the ingredients which do not dissolve. It will therefore be understood that the term "incorporated" as used herein with reference to rubber in combination with the hydrocarbon is intended to mean total dissolution, partial dissolution, or dispersion and suspension of the rubber in the hydrocarbon, as well as any combinations thereof, and including compounding ingredients which may be contained in the rubber. The terms "digested" or "digestion" as used herein are intended to mean partial dissolution of the rubber, or compound, and dispersion and suspension of any undissolved components of the rubber or rubber compound in the hydrocarbon. As will be demonstrated hereinafter, incorporation of rubber, or a rubber compound-suitable for practice of this invention-can be accomplished by simple means.

The limit to the amount of rubber which should be incorporated with the liquid hydrocarbon is determined by the viscosity of the resulting solution or mixture. The liquid must be sufficiently fluid for pumping, metering and spraying a carbon black feedstock, e.g. below 350 (Saybolt Seconds Universal) when measured at 210° F. The feedstock may be heated to achieve a desired viscosity when preferable and practical to do so.

Thus, the proportion of rubber and hydrocarbon in the feedstock can be optimized for maximum solubility at an acceptable viscosity level. In advantageous embodiments of the invention a vulcanized rubber compound, particularly scrap automobile tires, is digested in a liquid aromatic hydrocarbon having a BMCI above about 90. To accelerate the digestion the tires should be particulated by shredding prior to mixture with the aromatic hydrocarbon, and the mixture should then be agitated at a temperature of about 250° F. to 700° F., the upper limit being restricted by the boiling point of the rubber-hydrocarbon mixture.

It will be appreciated that automotive tires contain components other than rubber which are insoluble in the liquid hydrocarbon, e.g. carbon black, carbon-rubber gel, zinc oxide, other compounding components and tire cord. Most of these can be effectively dispersed and suspended within the hydrocarbon during the digestion process. Sludge, which consists of the tire cord and any other insoluble materials which would interfere with pumping, metering and dispersion of the feedstock in the hot pyrolysis gases, can be strained out of the feedstock beforehand. Otherwise, the dispersed and suspended insolubles may be left in the feedstock since they have no grossly detrimental effects upon the production rate or quality of the resultant carbon black.

When digesting rubber tires, an aromatic feedstock oil having a BMCI of about 90 to about 160 can be employed to produce a feedstock which contains about 0.1 to about 1.0 lb. of dissolved and suspended components of the tire in each gallon of the feedstock oil used in making up the mixture. To advantage, the feedstock oil can have a BMCI of about 115 to about 135, and from about 0.375 to about 0.75 lb. of the tire components can be digested in each gallon of the feedstock.

It will also be appreciated that scrap rubber other than tires can also be employed for preparing a feedstock and manufacturing carbon black in accordance with the present invention.

As previously indicated, the rubber modified feedstocks of this invention may be employed in any of the well known processes for making carbon black wherein a liquid hydrocarbon is dispersed and thermally decomposed within highly heated gases, and from which the resultant carbon black is subsequently separated and collected. Thus, the invention is not restricted to one particular process for manufacturing carbon black, but may be practiced with the large variety of oil furnace black processes and even with channel and thermal black processes wherein the feedstock gas is enriched with oil.

DESCRIPTION OF A PREFERRED EMBODIMENT

After removal of the steel beads, a nondescript variety of worn-out automobile tires were shredded into pieces about 3/8" long by 1/4" wide. Much of the tire cord was stripped loose from the rubber during the shredding operation and was separated from the rubber particles by blowing with air.

A rubber-containing carbon black feedstock was produced by digesting 190 pounds of the shredded tire rubber in 250 gallons of an aromatic carbon black feedstock oil having the properties shown in Table I. Digestion of the tire rubber was accomplished by circulating the mixture at 550° F. for 6 hours through a rotary gear pump. After digestion of the rubber, the modified oil was strained to remove a small amount of sludge which consisted mostly of tire cord.

The characteristics of the modified feedstock oil are also shown in Table I.

Using a conventional oil furnace process for the manufacture of tread grades of carbon black, the unmodified feedstock oil of Table I was pyrolyzed at the rate of 59 gallons (60° F.) per hour. The feedstock oil of Table I was sprayed into the reaction chamber of the furnace after being preheated to 195° F. The atomized oil was vaporized by heating within the furnace chamber and became dispersed within heated gases produced by burning 3 M s.c.f.h. of naturel gas with 45 M s.c.f.h. of air within the furnace, other furnace conditions also being set to produce an ISAF grade of tread black. The resultant aerosol of carbon in hot gases was then quenched prior to collection of the carbon black in cnventional separating equipment. After running four hours, a sample of the carbon black was collected for testing; and without shutting down or changing any other conditions, the operation was changed over to use of the modified feedstock oil, which was also sprayed into the furnace at the rate of 59 gallons (60° F.) per hour.

TABLE I

| | Unmodified feedstock oil | Modified feedstock oil containing digested tire rubber |
|---|---|---|
| API gravity | .2 | −2.0 |
| Viscosity, SSU at— | | |
| 130° F | 594 | 2910 |
| 210° F | 67 | 227 |
| Molecular weight | 295 | 370 |
| BMCI | 123 | 125 |
| Index of refraction | 1.648 | |
| Wt. percent: | | |
| Sulfur | 1.060 | 1.50 |
| Ash | .003 | 0.245 |
| Benzene insolubles | .039 | 3.315 |
| Asphaltenes | .50 | 9.40 |
| UOP, K factor | 10.0 | 10.2 |
| Avg. B.P., ° F | 790 | 915 |
| Specific gravity | 1.0744 | 1.0927 |
| Lb./gal | 8.949 | 9.102 |
| Ultimate analysis, wt. percent: | | |
| Carbon | 89.94 | 89.75 |
| Hydrogen | 8.29 | 7.67 |
| Sulphur | 1.03 | 1.26 |
| Ash | 0.03 | |
| Other | 0.71 | |

After 75 minutes of operation, a sample of the carbon black produced from the modified feedstock oil was collected and the results of colloidal, chemical, and physical tests on both samples is shown in Table II.

TABLE II

| | Carbon black "A" from unmodified oil | Carbon black "B" from modified oil |
|---|---|---|
| Tinting strength, percent FF | 117 | 117 |
| Dibutylphthalate adsorption (DBP) | 121.3 | 132.1 |
| Percent benzene discoloration (trans.) | 99 | 99 |
| Iodine adsorption | 116.22 | 115.60 |
| Color | | |
| DPG | 7.16 | 6.5 |
| Percent heating loss | 1.78 | 1.70 |
| Percent benzene extract | .02 | .03 |
| Percent volatile | 1.78 | 1.61 |
| Percent ash | 0.15 | 0.15 |
| pH | 6.9 | 7.2 |
| Percent sulphur | .98 | .93 |
| Percent seive residue: | | |
| 30 mesh | [1] .003 | [1] .002 |
| 325 mesh | [2] .015 | [2] .020 |
| Calculated yield of carbon black, lb./gal | 4.4 | 4.54 |

[1] Rust.  [2] Coke grit.

As can be seen from Table II, an ISAF type black was produced from both the unmodified and the modified feedstock oils. It is especially significant that Carbon Black "B," was characterized by acceptably low coke grit, ash and sulfur contents, since rubber properties can be adversely affected if the content of these substances is too high.

To evaluate the performance of these two blacks in rubber, each was compounded into natural rubber and SBR rubber. Recipies were as follows:

NATURAL RUBBER

| | Parts by weight | |
|---|---|---|
| | 1 | 2 |
| Natural rubber | 100.0 | 100.0 |
| Carbon black: | | |
| "A" | 50.0 | |
| "B" | | 50.0 |
| Stearic acid | 3.0 | 3.0 |
| Benzothiazyl disulfide | 0.6 | 0.6 |
| Sulfur | 2.5 | 2.5 |
| Zinc oxide | 5.0 | 5.0 |

SBR-rubber

| | 3 | 4 |
|---|---|---|
| SBR-1500 | 100.0 | 100.0 |
| Carbon black: | | |
| "A" | 50.0 | |
| "B" | | 50.0 |
| Zinc oxide | 5.0 | 5.0 |
| Benzothiazyl disulfide | 0.8 | 0.8 |
| Tetramethylthiuramdisulfide | 0.15 | 0.15 |
| Sulfur | 1.75 | 1.75 |

These compounds were then vulcanized and tested to determine stress-strain and other properties. Results are shown in Table III.

TABLE III

Natural rubber

|  | 1 | 2 |
|---|---|---|
| L-300 Modulus, p.s.i.: |  |  |
| 15′ | 1,955 | 1,750 |
| 30′ | 2,400 | 2,230 |
| Tensile, p.s.i.: |  |  |
| 15′ | 3,830 | 3,710 |
| 30′ | 4,095 | 3,950 |
| Elongation, percent: |  |  |
| 15′ | 545 | 560 |
| 30′ | 490 | 515 |
| Rebound | 54.9 | 56.4 |
| Heat build up, deg. F | 286 | 286 |
| Scorch, mins | 9.25 | 9.75 |

SBR-rubber

|  | 3 | 4 |
|---|---|---|
| L-300 modulus, p.s.i.: |  |  |
| 25′ | 2,655 | 2,400 |
| 50′ | 2,950 | 2,720 |
| 100′ | 3,455 | 3,260 |
| Tensile, p.s.i.: |  |  |
| 25′ | 4,200 | 3,995 |
| 50′ | 3,940 | 4,020 |
| 100′ | 3,980 | 4,000 |
| Elongation, percent: |  |  |
| 25′ | 500 | 510 |
| 50′ | 425 | 455 |
| 100′ | 355 | 370 |
| Rebound | 49.1 | 48.7 |
| Mooney viscosity | 87.0 | 83.5 |

From Table III it can be seen that Compounds 2 and 4, which contained the carbon black produced from the rubber-modified feedstock oil, had lower modulus than Compounds 1 and 3, respectively, which contained the carbon blacks produced from the unmodified feedstock. Carbon Black "A" behaved like an ISAF-HS (high structure) black, which imparts high modulus to a rubber compound, while Carbon Black "B" behaved more like a conventional ISAF which imparts a degree of modulus considered normal for an ISAF. This does not imply that the quality of Carbon Black "B" was inferior since both "A" and "B" were, in fact, high quality ISAF blacks capable of delivering acceptably different levels of modulus in the particular recipies shown. It can be noted that Carbon Black "B" had a significantly higher DBP absorption than Carbon Black "A," which does imply that Carbon Black "B" had greater structure development. It will therefore be appreciated that the difference in modulus delivered by the two blacks can probably be at least partially attributed to a different response to cure, and that modulus can be adjusted to some extent by altering the contents of the rubber recipe. The point is, that with other factors remaining more or less the same, a high quality ISAF black was made, at good yield and production rate, merely by shifting to the rubber-modified feedstock oil during a conventional oil furnace black operation. It will further be appreciated by those skilled in the art that adjustments in grade can be made, or that even other grades can be produced quite easily by establishing and maintaining the furnace conditions required for production of a specific type of carbon black having preselected properties.

While the invention has been described with reference to particular materials, apparatus and process conditions, it will be understood that still others may be employed without departing from the spirit or scope of the invention as expressed in the appended claims.

Therefore, what is claimed is:

1. Method of producing carbon black from rubber which comprises:
   (a) incorporating a rubber with a liquid hydrocarbon,
   (b) dispersing the resultant liquid mixture within highly heated gases,
   (c) thermally decomposing said rubber and said hydrocarbon by heat absorbed from said gases, thus forming carbon black, and
   (d) recovering the resultant carbon black.

2. The method of claim 1 in which the liquid hydrocarbon is an aromatic hydrocarbon.

3. The method of claim 2 in which the aromatic hydrocarbon has a BMCI within the range of about 90 to about 160.

4. The method of claim 2 in which the aromatic hydrocarbon has a BMCI within the range of about 115 to about 135.

5. The method of claim 2 in which said incorporated rubber is derived from a vulcanized rubber compound, and other components of said vulcanized rubber compound which are substantially insoluble in said hydrocarbon are suspended therein, and the resultant liquid mixture is dispersed within the highly heated gases.

6. The method of claim 5 in which the aromatic hydrocarbon has a BMCI within the range of about 90 to about 160 and the combined content of said dissolved rubber and said suspended components is within the range of about 0.1 to about 1.0 lb. per gallon of the aromatic hydrocarbon 7. The method of claim 1 wherein said mixture of rubber and hydrocarbon has a viscosity below 350 Saybolt Seconds Universal when measured at 210° F 8. The process of claim 1 wherein said mixture of rubber and hydrocarbon is dispersed within said highly heated gases while contained within a furnace 9. The process of claim 2 wherein said vulcanized rubber is automobile tire rubber.

References Cited

UNITED STATES PATENTS

| 1,606,380 | 11/1926 | Pagenkoff | 423—449 |
| 2,564,700 | 8/1951 | Krejci | 423—456 |
| 3,048,218 | 8/1962 | Gunther | 260—2.3 X |
| 3,073,681 | 1/1963 | Ceresna | 23—209.4 |
| 3,244,484 | 4/1966 | Johnson | 23—209.4 |
| 3,240,565 | 3/1966 | Krejci et al. | 23—209.4 |

OTHER REFERENCES

Ball, "Reclaimed Rubber," 1947, p. 121.

Morton, "Introduction to Rubber Technology," copyright 1959, pp. 169–171.

EDWARD J. MEROS, Primary Examiner

U.S. Cl. X.R.

423—450